United States Patent

[11] 3,571,977

| [72] | Inventor | Peter C. Abeel |
| | | Kent, King, Wash. |
| [21] | Appl. No. | 838,056 |
| [22] | Filed | June 27, 1969 |
| [45] | Patented | Mar. 23, 1971 |
| [73] | Assignee | The Boeing Company |
| | | Seattle, Wash. |

[54] ACCESS AND PRESSURE RELEASE DOOR LATCH MECHANISM
6 Claims, 5 Drawing Figs.

[52] U.S. Cl. .................................................. 49/379,
49/141, 49/394, 98/1.5, 244/129, 292/99
[51] Int. Cl. ........................................................ E05b 65/06,
E05b 65/10
[50] Field of Search ........................................ 49/31, 141,
272, 379, 394; 98/1.5; 244/129, 117; 292/(ARL),
(U), 374, 93, 99; 220/55.3

[56] References Cited
UNITED STATES PATENTS
2,748,855  6/1956  Siems et al. .................... 49/379X

| 2,929,648 | 3/1960 | Bobrick ....................... | 292/99 |
| 3,228,676 | 1/1966 | Wittenberg .................. | 292/99X |
| 3,387,804 | 6/1968 | Rhines ......................... | 98/1.5X |
| 3,390,846 | 7/1968 | Stevinson et al. ........... | 244/129X |
| 3,426,984 | 2/1969 | Emmons ...................... | 98/1.5X |
| 3,451,702 | 6/1969 | Little ............................ | 49/379 |
| 3,453,777 | 7/1969 | Reilly .......................... | 49/141 |

*Primary Examiner*—J. Karl Bell
*Attorneys*—Glenn Orlob, Bernard A. Donahue and Kenneth W. Thomas

ABSTRACT: A force actuated latch mechanism for use in combination with an access and pressure relief door for a pressurized chamber. The preferred embodiment relates to a combined pressure relief and access door for an aircraft nacelle structure wherein the door is pivotally mounted near its forward or upstream edge and is provided with a spring-biased overcenter latch mechanism near its aft or downstream edge. Quick release from the outside of the chamber is achieved by insertion of a simple implement such as a screwdriver and application of hand pressure.

PATENTED MAR 23 1971

INVENTOR.
PETER C. ABEEL
BY
Bernard A. Donahue
ATTORNEY

INVENTOR.
PETER C. ABEEL
BY
Bernard A. Donahue
ATTORNEY

ACCESS AND PRESSURE RELEASE DOOR LATCH MECHANISM

This invention relates to latch mechanisms for a dual-purpose aircraft door which will open at a predetermined internal pressure, and which can be quickly opened from its exterior for routine maintenance and inspection purposes.

In modern aircraft, heated air under high pressure is ducted from the engines, through the nacelle structure and into the interior of other areas of the aircraft for purposes such as cabin pressurization and to prevent icing of leading edge surfaces. It has been found necessary to provide numerous "blowout" or pressure relief doors to prevent failure of skin panels and other major structural components in the event a bleed air duct should rupture. It is also necessary to provide access panels for routine maintenance servicing and inspection.

Certain prior art configurations have combined the access and pressure relief functions by the use of large and heavy preloaded cantilever springs anchored by bolts into the structure surrounding the door. These springs act upon the door to retain it in a closed position until a predetermined internal pressure is reached. To open the door in such installations for routine maintenance or inspection purposes it is necessary to remove several bolts which anchor the spring.

It is an object of this invention to provide a lightweight dual-purpose aircraft door system wherein the door may be opened quickly by a mechanic during maintenance servicing.

A further object of this invention is to provide a door system which is releasably held in place by at least one latch mechanism which will remain in a closed position until a predetermined internal pressure is achieved, and which will be thrown over and held in an open position when the predetermined internal pressure level is sustained for a finite period of time.

A related object is to provide an aircraft structural door system embodiment which will open to provide pressure relief and which is hingedly mounted to seek a balanced position dictated by free stream aerodynamic forces and internal pressure forces.

A related object is to provide an aircraft structural door system embodiment which will open to provide pressure relief and which is pivotally mounted to rotate about one end into a position wherein the pivotal mount will allow the door to leave the aircraft.

A related object is to provide a door latch mechanism which includes force means operable to hold the mechanism in a closed position until acted upon either by forces tending to displace said door outwardly, or by hand pressure forces applied to a simple leverlike implement for instant release or resetting of said mechanism.

A further related object is to provide a latch mechanism which is force released and manually reset, as opposed to prior art latches which are manually released and force reset.

The above objectives have been achieved by the provision of a unique overcenter latch mechanism in combination with an access door which is preferably pivotally mounted for initial movement. The latch mechanism is spring biased into a closed position where it responds either to a predetermined force acting upon the door, or to a leverlike implement operated by a mechanic, to move the mechanism to an overcenter open position, thereby allowing the door to open.

DESCRIPTION OF THE PREFERRED EMBODIMENT

Figure 1:
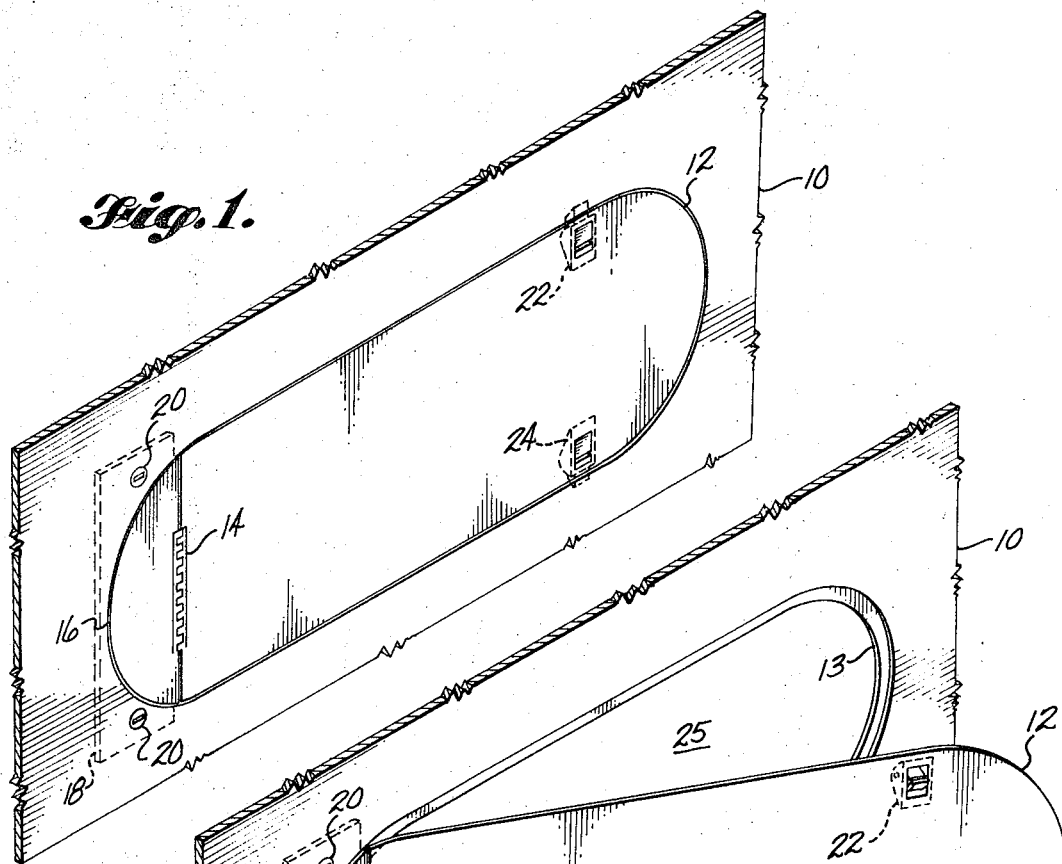
FIG. 1 is a schematic representation of a door system in the closed position, capable of withstanding a predetermined internal pressure.
Figure 2:
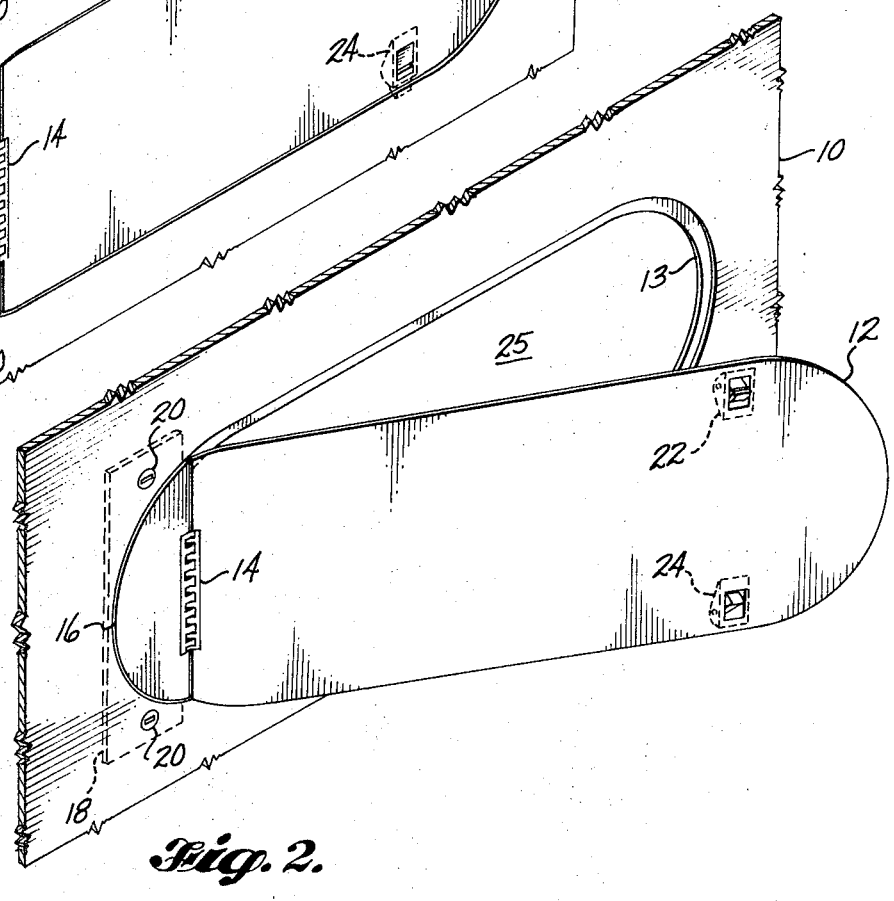
FIG. 2 depicts the door in the open position after the latch mechanisms have been released by internal pressure.

Referring now to FIGS. 1 and 2, a pressurized structure 10 is provided with a dual-purpose door 12. The door 12 is nested into a frame 13 and is rotatably mounted on a flush pivotal joint 14. The joint 14 is attached to a frame member 16, which is seen to be integrally mounted on support member 18. The member 18 is attached to structure 10 by suitable fastening means such as flush bolts 20.

Latch mechanisms 22 and 24 are attached to the door 12, retaining the door assembly in a closed position in a manner to be hereinafter described. FIGS. 1 and 2 schematically depict a typical aircraft installation such as would be appropriate for nacelle structure. The joint 14 is mounted at the forward or upstream edge of the door 12, the latch mechanisms being mounted near the aft or downstream edge of the door.

The joint 14 may optionally be either a flush hinge of a type which permanently mounts the door 12 to the frame member 16, or if desired, the joint 14 may be of a type which will release the door after a predetermined rotary movement of the door into the open position. The release-type joint has the disadvantage that the door may leave the aircraft if actuated in flight. However, the release joint system offers an advantage which can be significant during routine maintenance. A mechanic may remove the entire door merely by rotating the door to a certain position and drawing the door outwardly from the joint 14. In such a case the door is preferably attached to the inner nacelle structure by at least one lanyard, for retention below the opening during servicing. The lanyard would necessarily be of a type which would be released under loads corresponding to inflight actuation to prevent damage to the aircraft skin as the door leaves the aircraft.

Figure 3:
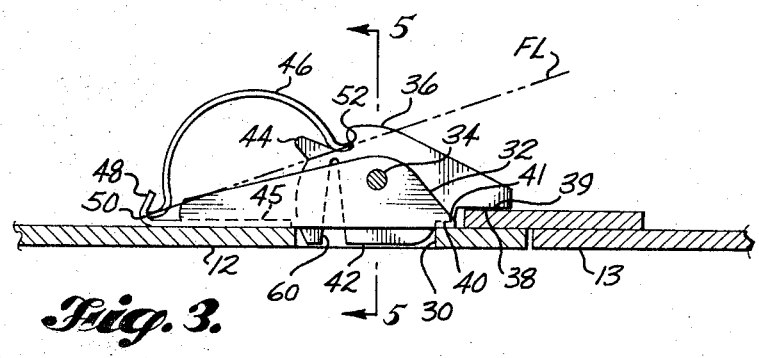
FIG. 3 shows the latch mechanism in the closed position.

FIG. 3 is a sectional view of the latch mechanism in the closed position. The door 12 is held in flush alignment with frame 13. In this embodiment the door 12 has an opening 30 over which a latch frame 32 is rigidly affixed. A pivot pin 34 rotatably mounts a latch pawl 36 which includes a nose portion 38 positioned for contact with corresponding surface 39 of frame 13, to prevent the door 12 from opening.

In this closed position of the latch mechanism, a surface 40 of pawl 36 is in bearing contact with a surface 41 of frame 32. Pawl surface 42 is shaped to present a smooth flush exterior contour within the opening 30. A lug portion 44 is shaped to provide a stop member for abutting contact with a frame surface 45 to establish the open position of the latch shown in FIG. 4.

In the closed latch position of FIG. 3 a spring plate 46 urges the pawl 36 in a clockwise direction about pivot pin 34 by application of a linear force along line FL. The plate 46 is nested in frame flange 48 at radius 50 and contacts the pawl at recess 52.

It is apparent that the spring plate 46 applies a clockwise holding moment to the pawl 36 which is reacted by the latch frame at surface 41. The holding moment for this embodiment will be equal to the product of the spring force and the minimum distance of line FL from the center of pin 34. Until this holding moment is overcome, the latch mechanism will be held in the closed position with pawl surface 40 in bearing contact with frame surface 41.

The spring plate 46 and the geometry of the latch mechanism may be sized and arranged to give a preselected holding moment to prevent the pawl 36 from rotating, and therefore the door from opening, until a predetermined counteracting moment is applied to the pawl.

When internal pressure acts upon the door 12, a reaction force will be developed at frame surface 39 through bearing forces imparted by the pawl nose portion 38. The force acting on nose portion 38 will create a counterclockwise moment tending to counteract the holding moment imparted through spring plate 46. However, the pawl will not rotate until the counteracting moment slightly exceeds the holding moment, at which time the pawl 36 will begin to rotate about the pin 34.

It is to be noted that the spring plate 46 will continue to resist rotation of the pawl after the door has opened until the line of action FL passes through the center of pin 34. Accordingly, under a short time interval impulse loading, the door may open slightly to release pressure loads or absorb inertia loads and then return to its closed position. However, under a sustained loading in excess of a preselected holding moment, the pawl will be rotated until force line FL passes over the center of pin 34, at which time the spring plate 46 will act to aid in opening the mechanism.

It will be apparent to persons skilled in the mechanical design art that the loads tending to open the latch mechanisms, for any given internal pressure acting upon the door, may be readily computed from well-known force balance principles. Accordingly, to design a door system which will open under a particular pressure loading involves consideration of the geometric parameters, the number of latches desired, spring design, and other routine matters.

Figure 4:
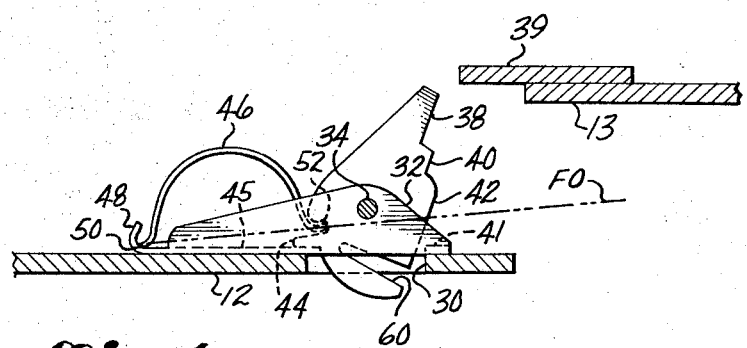
FIG. 4 shows the latch mechanism held in the open position.
Figure 5:
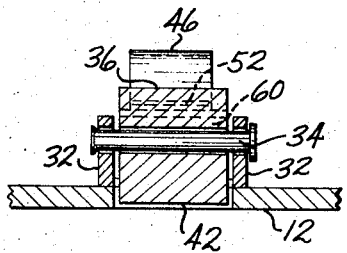
FIG. 5 is a cross section of the latch taken along line 5–5 in FIG. 3.

FIG. 4 shows the mechanism in an open position. Spring plate 46 generates a linear force along line FO which tends to rotate pawl 36 in a counterclockwise direction thereby holding pawl lug 44 against frame surface 45. For manual actuation of the latch, a recess 60 is provided in the pawl 36 so that a mechanic may either open or close the latch mechanism in quick-release fashion.

The recess 60 is preferably shaped to receive and nest the pointed blade of a screwdriver or similar implement. By inserting the screwdriver into the recess 60 and applying hand pressure to the handle a mechanic can immediately rotate the pawl to reset the mechanism. Therefore, for routine maintenance or inspection purposes, the door may be opened instantly, thereby eliminating time-consuming bolt removal situations associated with prior art access and pressure release doors.

It will be apparent to persons skilled in this art that many modifications can be made to the preferred embodiment which has been disclosed. For example, the spring plate 46 which is used to apply the locking moment for holding the pawl in either a closed or open position, may be replaced by other suitable means for applying a predetermined force to the pawl. Such optional means might include linear springs with a cammed detent, torsional springs with assorted linkages, and many overcenter devices which are known in the mechanical design art. In a similar fashion, the recess 60 may be replaced with other suitable shapes which would provide a means for allowing a mechanic to apply forces counteracting the holding forces on the pawl.

I claim:

1. A door system for controlling pressure within a pressurized chamber and for permitting quick access to said chamber comprising:

a door member operably mounted on an exterior wall of said chamber;

a latch mechanism having a closed position in which said mechanism is operably connected between said door and said wall comprising:
means for holding said mechanism in said closed position;
means responsive to a predetermined force applied to said door for actuating said mechanism from said closed position to an open position;
means responsive to a predetermined contact force applied to said mechanism from the exterior of said chamber through an implement inserted into a recess in said mechanism for changing the position of said mechanism from either of said open or closed positions to the other of said positions; and said door system being responsive to a predetermined pressure within said chamber to actuate said mechanism to allow said door to open, and wherein the mechanism may be selectively actuated by contact forces applied directly to the mechanism.

2. The system of claim 1 wherein said door member is operably mounted on said exterior wall on a pivotal joint which requires said door to rotate about said pivotal joint for initial movement in opening and wherein said latch mechanism comprises rotatably mounted means for transferring forces between said door and said wall and said means for holding comprises means for applying an elastic force to said rotatably mounted means.

3. A spring biased latch mechanism which comprises a pivotally mounted pawl member having a nose portion which is disposed in a closed position to transfer a predetermined force to said mechanism from an object having movement relative to said mechanism, said pawl member having a recessed portion shaped to receive an implement for the application of forces for selective rotation of said pawl, and a spring member arranged to apply a predetermined rotary movement for preventing rotation of said pawl.

4. A mechanism according to claim 3 wherein said spring member acts to urge said pawl in a first direction when said mechanism is in a closed position and in the opposite direction when said mechanism is in an open position.

5. A mechanism according to claim 3 wherein said spring member is arranged to apply a linear force to a recess in said pawl member and wherein said linear force acts to provide a predetermined rotary movement tending to retain said pivotally mounted pawl member in said closed position.

6. A mechanism according to claim 4 comprising a latch frame having a centrally disposed opening therethrough, and a pivot pin supported by said latch frame; wherein said pawl is rotatably mounted on said pivot pin so that in said open position said recessed portion will extend through said centrally disposed opening.